United States Patent [19]

Falk

[11] 4,302,555

[45] Nov. 24, 1981

[54] COMPATIBILIZATION OF POLYSTYRENE AND PVC

[75] Inventor: John C. Falk, Chicago, Ill.

[73] Assignee: Borg-Warner Chemicals, Inc., Parkersburg, W. Va.

[21] Appl. No.: 171,628

[22] Filed: Jul. 23, 1980

[51] Int. Cl.$^3$ .................. C08L 25/06; C08L 27/06; C08L 53/02

[52] U.S. Cl. .................. 525/96; 525/98; 525/239

[58] Field of Search .................. 525/90, 314, 356, 96, 525/239

[56] References Cited

U.S. PATENT DOCUMENTS

| 3,293,226 | 12/1966 | de Schrijver | 525/356 |
|---|---|---|---|
| 3,686,356 | 8/1972 | Saam | 525/90 |
| 3,825,622 | 7/1974 | Robeson et al. | 525/96 |
| 3,825,622 | 7/1974 | Robeson et al. | 525/96 |
| 3,936,417 | 2/1976 | Ronden | 260/42.45 |
| 4,054,615 | 10/1977 | Hardt et al. | 525/70 |
| 4,080,357 | 3/1978 | Gergen et al. | 260/42.18 |
| 4,096,204 | 6/1978 | Gergen et al. | 525/96 |
| 4,208,315 | 6/1980 | Zweig | 525/96 |

FOREIGN PATENT DOCUMENTS 46-19860  3/1971  Japan .................. 525/314

*Primary Examiner*—Wilbert J. Briggs, Sr.
*Attorney, Agent, or Firm*—Richard J. Schlott

[57] ABSTRACT

Blends of PVC and polystyrene are made compatible by the addition of from 1 to 20 wt %, based on final composition, of a chlorinated styrene-butadiene block copolymer.

3 Claims, No Drawings

COMPATIBILIZATION OF POLYSTYRENE AND PVC

BACKGROUND OF THE INVENTION

This invention relates to blends of polyvinyl chloride (PVC) and polystyrene. More particularly this invention relates to stable blends of PVC and polystyrene having incorporated therein a chlorinated styrene-butadiene block copolymer as a compatibilizing aid, and to a method for forming stable blends of PVC and polystyrene.

Polyvinyl chloride and polystyrene are rigid thermoplastic resins, each having wide commercial application. The resins differ markedly in solubility behavior, the high chlorine content making PVC more polar in character then polystyrene. Because the resins are not miscible and are otherwise not compatible, blends of the two polymers readily separate upon melt processing into discrete, discontinuous component domains. These domains do not adhere to one another well, which results in brittle, low strength moldings.

Methods for forming stable blends of PVC and polystyrene would be desirable. The successful incorporation of PVC into polystyrene compositions would be expected to impart reduced flammability to structural sheet and foam.

SUMMARY OF THE INVENTION

Blends of PVC and polystyrene are compatibilized by the incorporation of from 1 to about 20 wt %, based on weight of the final composition, of a chlorinated styrene-butadiene block copolymer. The compatibilized blends do not readily undergo phase separation from solution, and molded specimens exhibit improved tensile strengths and reduced brittleness.

DETAILED DESCRIPTION OF THE INVENTION

The chlorinated block copolymers useful for forming compatible blends of polystyrene and PVC according to the practice of this invention are block copolymers of styrene and butadiene having substantially all the ethylenic saturation removed by chlorination.

The precursor block copolymers which are to be chlorinated may be more fully described as A-B block copolymers having a single A block formed of polymerized styrene and a single B block formed of polymerized, 1,3-butadiene. The B block of the polymer may be substantially linear by virtue of a predominantly 1,4-addition polymerization of the 1,3-butadiene monomer component, or made more highly branched by way of polymerizing a part or substantially all of the 1,3-butadiene monomer component in a 1,2-addition reaction. The precursor block polymer will contain from about 30 to about 70 wt % styrene units and correspondingly from 70 to about 30 wt % butadiene units. Where the butadiene component is substantially linear, the preferred precursor block copolymer will contain about 50 wt % of each block, while in compositions having a more highly branched butadiene component, the preferred compositions may contain as little as 30 wt % of the styrene moiety.

Methods for the preparation of the precursor block copolymers are well established in the prior art and many examples of such materials are readily available from commercial sources. In general, the method for their preparation involves the sequential addition of the two monomers to a polymerization vessel containing an anionic polymerization initiator such as for example a lithium alkyl. A more detailed description of the preparation of the precursor styrene-butadiene block copolymers will be found in an article by H. L. Hsieh in *J. Polymer Science A* 3 153 (1965). Chlorination of the styrene-butadiene block copolymer is carried out by contacting a dilute solution of the copolymer dissolved in a suitable inert solvent with elemental chlorine. An addition of one chlorine molecule to each of the ethylenic double bonds of the polybutadiene segment takes place. The chlorination is carried out until substantially all the ethylenic unsaturation is removed, resulting in a block copolymer having an A block of polystyrene and a B block of chlorinated polybutadiene.

Blends of from 5 to 95 parts by weight polystyrene and correspondingly from 95 to 5 parts by weight polyvinyl chloride are compatibilized by the addition of from 1 to 20 wt %, based on final composition, of the chlorinated block copolymer. The blends may be formed by any of the conventional processes including dry powder blending, coagulation from a solution of the polymers, melt mixing, milling, extrusion and the like. The blends may further contain conventional dyes, foaming agents, pigments, fillers, thermal stabilizers and processing aids as is widely practiced in the molding art.

The practice of this invention will be better understood by consideration of the following examples which are offered by way of illustration of the invention and not in limitation thereof.

EXAMPLE 1.

PREPARATION OF THE CHLORINATED BLOCK COPOLYMER

A styrene-butadiene block copolymer containing 66 wt % styrene and having a weight average molecular weight of 100,000 was prepared by the process of Hsieh reference cited herein above.

A solution of 75 grams of the block copolymer in 600 ml of cyclohexane was prepared, then added to a three-necked flask containing 1500 ml of chloroform. The flask was fitted with a stirrer, a gas bubbler and a cold trap. The solution was cooled to 15° C. and stirred while 32.8 grams of chlorine glass were admitted through the gas bubbler over a period of one hour. The solution of chlorinated styrene butadiene copolymer was then swept with nitrogen and coagulated by pouring into six volumes of methanol. The coagulated polymer, after drying at 50° C. in a vacuum oven, amounted to 107 grams. No ethylenic unsaturation was detectable by infra red spectroscopic techniques.

In the following Examples, blends were prepared from commercially obtained polystyrene and PVC, employing the indicated chlorinated styrene-butadiene block copolymers as compatibilizing aids. The blends were prepared by mixing solutions containing from 5 to 10 wt % of the polymers and the compatibilizing aid dissolved in a suitable solvent such as tetrahydrofuran or methylene chloride, coagulating the resulting mixture in methanol, then filtering and drying the coagulated polymer blend. Plaques were compression molded from the dried blends and cut into test specimens for evaluation. The results of the tests are summarized in Table I.

TABLE I

| Example No. | Aid[2] Type | % | Tensil Str (psi) | E % | Izod[4] Impact |
|---|---|---|---|---|---|
| 2 | None | — | 3840 | <5 | 0.2 |
| 3 | 33 SBR/Cl | 10 | 1590 | <5 | 0.2 |
| 4 | 33 SBV/Cl | 10 | 5300 | <5 | 0.3 |
| 5 | 50 SB/Cl[3] | 10 | 6580 | 5 | 0.2 |
| 6 | 50 SB/Cl[3] | 20 | 6100 | 6 | 0.2 |

Blends of Polystyrene and PVC (50/50)[1]

Notes:
[1] Polystyrene obtained as HF-55 from Dow Chemical Co; PVC obtained as Marvinol 53 from Uniroyal, Inc.
[2] 33 SB/Cl = 33 Styrene-67 butadiene block copolymer, chlorinated in Example 1. 33 SBR/Cl = 33 styrene-67 butadiene random copolymer, chlorinated as in Example 1. 33 SBV/Cl = 33 styrene-67 butadiene block copolymer having >80% 1,2-polymerized butadiene component, chlorinated as in Example 1.
[3] 50 SB/Cl from Example 1.
[4] Izod Impact, ft lbs/in notch at 73° F.

It will be apparent from the Examples that the addition of the chlorinated block copolymer compatibilizing aid improves the tensile properties and decreases the brittleness of blends containing polystyrene and PVC (compare Examples 4–6 with Example 2). That the block copolymer structure is a requisite for successful compatibilization will be seen from a comparison of Examples 4–6 with Example 3 employing a chlorinated random copolymer of styrene and butadiene.

Example 7. A blend of 50 parts by weight PVC, obtained as Marvinol 53 from Uniroyal, Inc. and 50 parts rubber-modified high impact polystyrene, obtained as Styron 440 from Dow Chemical Co. was prepared containing 10 wt %, based on final composition, of a 33 SB/Cl chlorinated block copolymer (33 wt % styrene and 67 wt % butadiene) as a blending aid. The polymer blend, when molded, had a tensile strength of 5600 psi, an elongation of 6% and an Izod Impact of 0.3 ft. lbs/in notch.

A control blend containing only PVC and high impact polystyrene was brittle, having a tensile strength of 3570 psi, an elongation of <1% and an Izod Impact value of 0.2.

A further demonstration of the compatibilizing effect of the chlorinated block copolymer aids is shown by the behavior of solutions containing these materials upon centrifugation. In the following Examples, equal volumes of solutions containing 10 g of PVC dissolved in 100 ml of tetrahydrofuran and 10 g of polystyrene dissolved in 100 ml of tetrahydrofuran were thoroughly mixed, together with varying amounts of the compatibilizing aid of Example 1. The mixtures, in 14 cc. portions, were then centrifuged using a clinical centrifuge operated at 1700 rpm for the time periods shown below. The amount of phase separation was noted as a measure of the incompatibility of the two polymer solutions. The results of this procedure are summarized in Table II.

TABLE II

Phase Separations of PVC and Polystyrene in THF

| Example No. | Aid Wt % | Phase Separation (%) in | | | |
|---|---|---|---|---|---|
| | | 5 min. | 30 min. | 45 min. | 90 min. |
| 7 | NONE | 15.7 | 98.5 | 98.5 | 98.5 |
| 8 | 1 | 1.4 | 45.7 | 57.1 | 78.5 |
| 9 | 3 | 1.4 | 1.4 | 1.4 | 90 |
| 10 | 5 | 1.4 | 1.4 | 1.4 | 87.1 |

It will be apparent from these data that the presence of as little as 1 wt % of the compatibilizing aid is sufficient to markedly slow the rate of phase separation of the two otherwise incompatible polymers.

The invention will thus be seen to be thermoplastic compositions comprising from 99 to 80 wt % of a blend containing from 5 to 95 parts by weight polystyrene and correspondingly from 95 to 5 parts by weight polyvinyl chloride, having incorporated therein from 1 to 20% by wt., based on final composition, of a chlorinated styrene-butadiene block copolymer.

I claim:

1. A thermoplastic composition comprising from 99 to 80 wt % of a blend containing from 95 to 5 parts by weight polystyrene and from 5 to 95 parts by weight polyvinyl chloride and correspondingly from 1 to 20 wt % of a chlorinated styrene-butadiene block copolymer.

2. The thermoplastic composition of claim 1 wherein said chlorinated styrene-butadiene block copolymer is a block copolymer consisting of from 70 to 30 wt % styrene monomer units and from 30 to 70 wt % 1,3-butadiene monomer units, and wherein substantially all ethylenic unsaturation has been removed by chlorination.

3. A method for the compatibilizing of thermoplastic blends comprising from 95 to 5 parts by weight of polystyrene and from 5 to 95 parts by weight of polyvinyl chloride consisting of incorporating therein from 1 to 20 wt %, based on final composition, of a chlorinated styrene-butadiene block copolymer.

* * * * *